(12) United States Patent
Mimura et al.

(10) Patent No.: US 8,319,914 B2
(45) Date of Patent: Nov. 27, 2012

(54) LIQUID CRYSTAL DISPLAY WITH NARROW ANGULAR RANGE OF INCIDENT LIGHT

(75) Inventors: Kouji Mimura, Tokyo (JP); Ken Sumiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/541,184

(22) Filed: Jul. 3, 2012

(65) Prior Publication Data

US 2012/0268690 A1 Oct. 25, 2012

Related U.S. Application Data

(62) Division of application No. 13/100,752, filed on May 4, 2011, now Pat. No. 8,237,885, which is a division of application No. 11/229,494, filed on Sep. 20, 2005, now Pat. No. 7,982,820.

(30) Foreign Application Priority Data

Sep. 21, 2004 (JP) ................................. 2004-273550

(51) Int. Cl.
*G02F 1/1333* (2006.01)
*G02F 1/1335* (2006.01)

(52) U.S. Cl. ............................. 349/64; 349/56; 349/112

(58) Field of Classification Search ................... 349/56, 349/64, 112
See application file for complete search history.

(56) References Cited

U.S. PATENT DOCUMENTS

| | | | |
|---|---|---|---|
| 5,280,371 | A | 1/1994 | McCartney et al. |
| 5,831,698 | A * | 11/1998 | Depp et al. ....................... 349/64 |
| 6,384,889 | B1 | 5/2002 | Miyachi et al. |
| 6,466,290 | B2 | 10/2002 | Kim et al. |
| 6,522,380 | B2 | 2/2003 | Lee et al. |
| 6,788,358 | B1 | 9/2004 | Kim et al. |
| 6,976,779 | B2 | 12/2005 | Ohtsuki et al. |
| 2003/0133068 | A1 | 7/2003 | Suzuki et al. |

FOREIGN PATENT DOCUMENTS

| | | |
|---|---|---|
| JP | 07-239467 | 9/1995 |
| JP | 9-179113 | 7/1997 |
| JP | 10-268305 | 10/1998 |
| JP | 11-337922 | 10/1999 |
| JP | 2002-277864 | 9/2002 |
| JP | 2004062037 | 2/2004 |

* cited by examiner

*Primary Examiner* — Brian M. Healy
*Assistant Examiner* — Mary El Shammaa
(74) *Attorney, Agent, or Firm* — Young & Thompson

(57) ABSTRACT

A liquid crystal display includes a liquid crystal panel in the pixel electrode and common electrodes formed within a pixel comprise repeating structures. The angular range of light incident from the light source is narrower along a direction of the repeating structures than along an orthogonal direction.

1 Claim, 8 Drawing Sheets

LIQUID CRYSTAL DISPLAY WITH NARROW ANGULAR RANGE OF INCIDENT LIGHT

CROSS REFERENCE TO RELATED APPLICATIONS

This application is a division of co-pending application Ser. No. 13/100,752 filed on May 4, 2011, which is a division of application Ser. No. 11/229,494 filed on Sep. 20, 2005, which claims foreign priority to Japanese Application No. 2004-273550 filed on Sep. 21, 2004. The entire content of each of these applications is hereby expressly incorporated by reference.

BACKGROUND OF THE INVENTION

1. Field of the Invention

The present invention relates to a liquid crystal display and, more particularly, to a liquid crystal display which exhibits an increased contrast ratio while maintaining a wide viewing angle.

2. Description of Related Art

Liquid crystal displays are used in various fields, from home use to medical use, because of their features such as low profile, light weight, and low power consumption; furthermore, their use is on the rise. Generally, in a liquid crystal display, a polarizing plate, liquid crystals, and a further polarizing plate are arranged in this order on a -backlight.

The liquid crystal display controls the quantity of light passing through the polarizing plate on the exit side by applying a voltage to the liquid crystal and performs display of an image.

The viewing angles of liquid crystal displays are steadily increasing due to previous technical developments, including in-plane switching mode (IPS mode) and vertical alignment mode (VA mode) in medical monitors, flat-screen televisions and the like. In-plane switching mode liquid crystal displays are preferred at present because of the smoothness of their viewing angle characteristics.

However, the demands for higher image quality on medical liquid crystal monitors, flat-screen liquid crystal televisions and the like continue to grow. Examples of requirements for higher-quality display include an increase in contrast ratio (the ratio between a luminance with which black is displayed (black luminance) and a luminance with which white is displayed (white luminance)). The contrast ratio increases with increasing white luminance and decreasing black luminance. That is, as the contrast ratio increases, the difference between white and black becomes clearer, and image quality improves. In particular, a contrast ratio of 1,000 or higher is strongly desired for medical monochrome liquid crystal monitors.

A technique for increasing the contrast ratio in a liquid crystal display is described in JP11-337922 (reference 1).

In the liquid crystal display of reference 1, only those light components whose angles of incidence are less than a predetermined angle relative to the perpendicular are permitted to impinge on the pixels from the backlight. More specifically, by limiting the angle of light incident on the liquid crystal panel, the light incident in a more oblique direction is reduced, and light scattering that would otherwise occur within the liquid crystal panel is prevented. As a result the black luminance is reduced, and in turn the contrast ratio is increased.

However, since the liquid crystal display disclosed in reference limits the angle of incident light in all directions parallel to the substrate, the increase in contrast ratio comes at the expense of reduced viewing angle and reduced luminance. The decreases in viewing angle and luminance are serious drawbacks, especially in liquid crystal panels intended to have a wide viewing angle such as the in-plane switching mode displays.

SUMMARY OF THE INVENTION

It is an object of the present invention to solve or at least to lessen the above-described problem by providing a liquid crystal display which exhibits a high contrast ratio while maintaining a wide viewing angle and high luminance.

In order to achieve that object, a first embodiment of the invention includes a liquid crystal display including a liquid crystal panel in which at least one of a pixel electrode and a common electrode formed within a pixel comprises repeating structures, and a light source illuminating said liquid crystal panel, wherein an angle range of light incident from the light source on the liquid crystal panel along a direction of the repeating structures is narrower than that along an orthogonal direction.

DETAILED DESCRIPTION OF PREFERRED EMBODIMENTS

Figure 1:
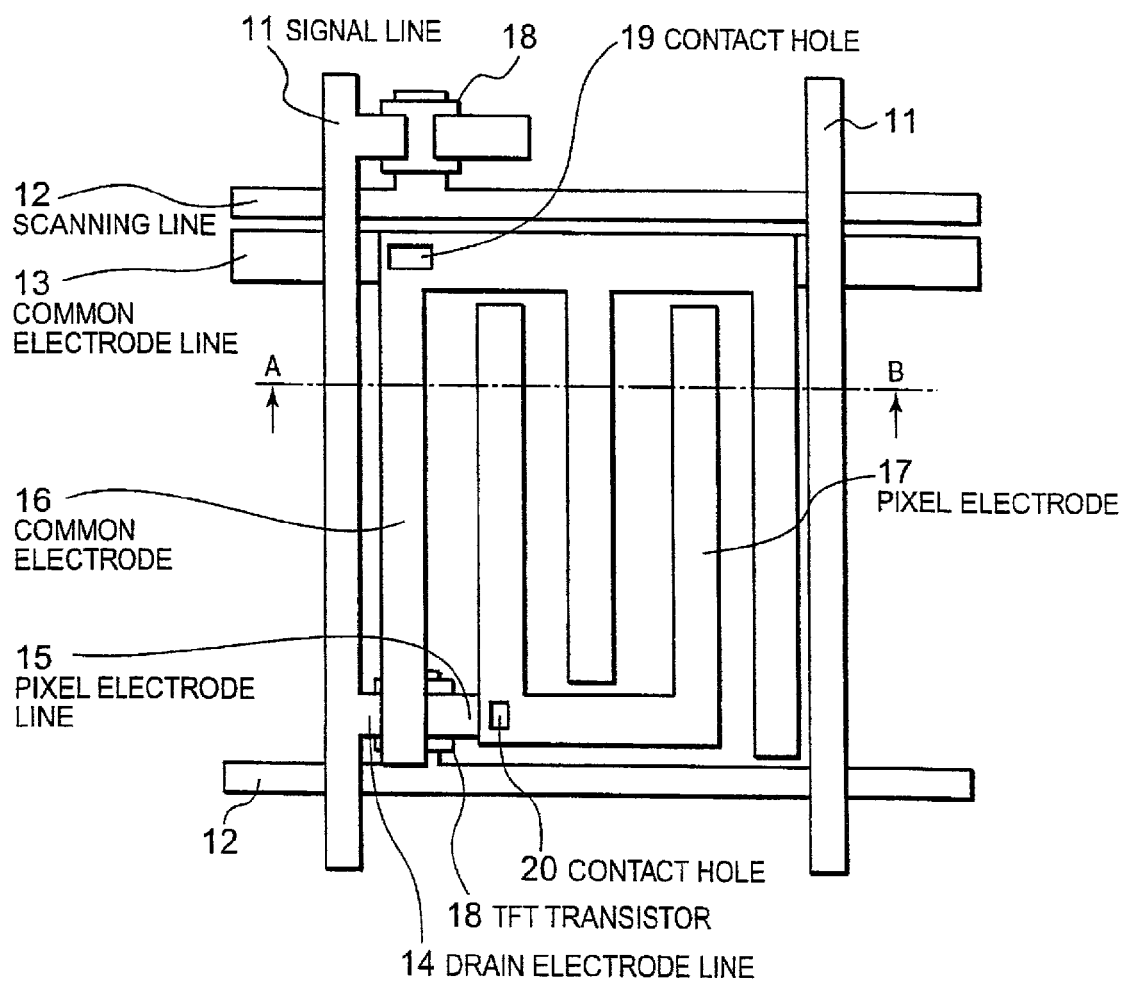
FIG. 1 is a plan view showing a liquid crystal display according to the first embodiment of the present invention.

To widen the viewing angle, the present inventors have thoroughly investigated the causes of low contrast ratio in liquid crystal displays wherein the pixel electrode or common electrode (or both) of a given pixel has repeating structures arising from coupling pattern units.

Examples of a liquid crystal display with the above-described structure include an in-plane switching mode display, a fringe-field switching mode display, and a patterned vertical alignment mode display.

The present inventors have discovered that in such a liquid crystal display, the contrast ratio degrades because scattering occurs at intervals in the plane of a liquid crystal panel due to repeating structures of an electrode. In particular, it is believed that scattered light beams which occur at intervals are intensified by interference, and scattering from repeating portions within a pixel contributes most significantly to degrading the contrast ratio.

Also, the present inventors have evaluated the contrast ratio using a backlight whose output angle range varies depending on the direction of light incident on the liquid crystal panel and found from the result that the contrast ratio increases by limiting the incident light angle in a direction which coincides with the direction of the cycles of the repeating structures of an electrode within one pixel and that the contrast ratio does not change by limiting the incident light angle in a direction orthogonal to that direction. Thus, it was found that the incident light angle need not be limited in a direction other than the direction of the repeating structures of the electrode.

The present invention is therefore able to achieve a high contrast ratio while maintaining a wide viewing angle, by causing the incident angle range along a direction of repeating structures of the electrode on the liquid crystal panel to be narrower than that along an orthogonal direction.

Thus, in a first aspect of the present invention, a backlight whose output angle range varies depending on the direction of light radiation is arranged behind a liquid crystal panel, and a direction in which the output angle range of light radiation from the backlight on the liquid crystal panel is relatively narrow is made to coincide with the direction of the repeating structures of an electrode formed within a pixel.

Whereas conventional liquid crystal displays limit the incident light angle in all directions around the normal axis, thereby impairing the viewing angle and luminance, with the arrangement of the present invention it becomes possible to minimize the sacrifice of the viewing angle and the luminance, and to increase the contrast ratio.

A second aspect of the present invention is that an output angle range ratio between a direction in which the output angle range is wide and a direction in which the output angle range is narrow is 1:3 or more . . .

This ratio makes it possible to increase the contrast ratio to 1.7 times or more than that of a conventional liquid crystal display while maintaining a wide viewing angle and to achieve a contrast ratio of 1,000 or more.

A backlight (FIG. 3) whose half-luminance angle in the horizontal direction is ±20° and whose half-luminance angle in the vertical direction is ±60° was arranged behind the liquid crystal panel, and the contrast ratio was evaluated as an example. The result showed that when the direction of the cycles of the repeating structures of an electrode within one pixel of the liquid crystal panel is made to coincide with the incident direction whose half-luminance angle is ±20°, the black luminance of the liquid crystal display is reduced to ⅔ or less than that of a conventional display, and the contrast ratio is increased by 1.7 times or more. Since the contrast ratio of a conventional in-plane switching mode liquid crystal display is approximately 600, the effect makes it possible to achieve a contrast ratio of 1,000 or more.

Since the incident direction whose half-luminance angle is ±20° is made to coincide with the direction of the cycles of the repeating structure of the electrode within one pixel, the viewing angle and the luminance in this direction are somewhat affected in this direction only. The viewing angle and the luminance in all other directions can be kept as wide as that of a conventional liquid crystal display.

A third aspect of the present invention is a liquid crystal display according to the first aspect of the present invention, further including a light-absorbing anisotropic member having repeating structures in which light-transmitting regions and light-shielding regions are alternated in a plane, wherein the light-absorbing anisotropic member is arranged between the liquid crystal panel and the light source, and a direction of repeating structures of the electrode coincides with a direction of cycles of the repeating structures of the light-absorbing anisotropic member.

In this aspect, only the incident light angle in a direction which coincides with the direction of the repeating cycles of the light-transmitting regions and light-shielding regions can be limited by the light-absorbing anisotropic member. Accordingly, this aspect increases the contrast ratio while maintaining a wide viewing angle and high luminance, while permitting a conventional backlight to be used without any modification.

A fourth aspect of the present invention is a liquid crystal display according to the first aspect of the present invention, further including an anisotropic diffuser arranged between the liquid crystal panel and the light source, wherein a direction of repeating structures of the electrode coincides with a direction in which diffusivity of the anisotropic diffuser is small.

The anisotropic diffuser used in the fourth aspect of the present invention has a diffusing power for light radiation which varies depending on the output angle. Accordingly, the range of an incident angle on the liquid crystal panel can be controlled by an incident direction. As a result, there is produced the effect that a conventional backlight can be used without any modification, similarly to the third aspect of the present invention.

A fifth aspect of the present invention involves using a liquid crystal display according to the first aspect of the present invention, and including an anisotropic lens sheet arranged between the liquid crystal panel and the light source, wherein a direction in which an incident angle range of light incident from the anisotropic lens sheet on the liquid crystal panel becomes relatively narrow, coincides with a direction of repeating structures of the electrode.

The anisotropic lens sheet used in the fifth aspect of the present invention can control the output angle range of light radiation from the backlight in accordance with the incidence direction, similarly to the third aspect of the present invention. Accordingly, in the fifth aspect of the present invention a conventional backlight can be used without any modification, similarly to the third aspect of the present invention and fourth aspect of the present invention.

A sixth aspect of the present invention involves a liquid crystal display wherein the vertical direction of display is the direction in which the angular range of light incident on the liquid crystal panel is relatively narrow.

With this arrangement, even though the viewing angle and the luminance in the vertical direction are limited, the viewing angle and the luminance in the horizontal direction are normal. This allows the display to be viewed with less discomfort than for a conventional liquid crystal display and at the same time makes it possible to provide a liquid crystal display with a wide viewing angle and high luminance whose contrast ratio has been increased as compared to a conventional liquid crystal display.

A seventh aspect of the present invention is a liquid crystal display according to the first aspect of the invention further comprising an anisotropic reflector plate arranged behind the light source, wherein the anisotropic reflector plate has a reflection angle which varies depending on a direction of light reflection, and a direction in which the reflection angle range is relatively narrow coincides with a direction of repeating structures of the electrode.

An eighth aspect of the present invention is terminal equipment having the above-described liquid crystal display. This invention makes it possible to provide terminal equipment with a wider viewing angle and higher contrast ratio than conventional terminal equipment.

As has been explained above, according to the present invention, a liquid crystal display which exhibits a high contrast ratio while maintaining a wide viewing angle and a high luminance can be provided by causing the angular range of light incident from a light source on the liquid crystal panel to be relatively narrow in a direction coinciding with the direction of the repeating structures of an electrode formed within a pixel.

A conventional backlight can be used by inserting a photoanisotropic member between the liquid crystal panel and the backlight, forming anisotropy in the incident angle range of the incident direction from the backlight on the liquid crystal panel, and/or making the direction of the repeating cycles of the electrode structure coincide with a direction in which the incident angle range of incident light is narrow.

The present invention will be further explained in detail below on the basis of preferred embodiments of the present invention and with reference to the drawings.

(First Embodiment)

Figure 2:
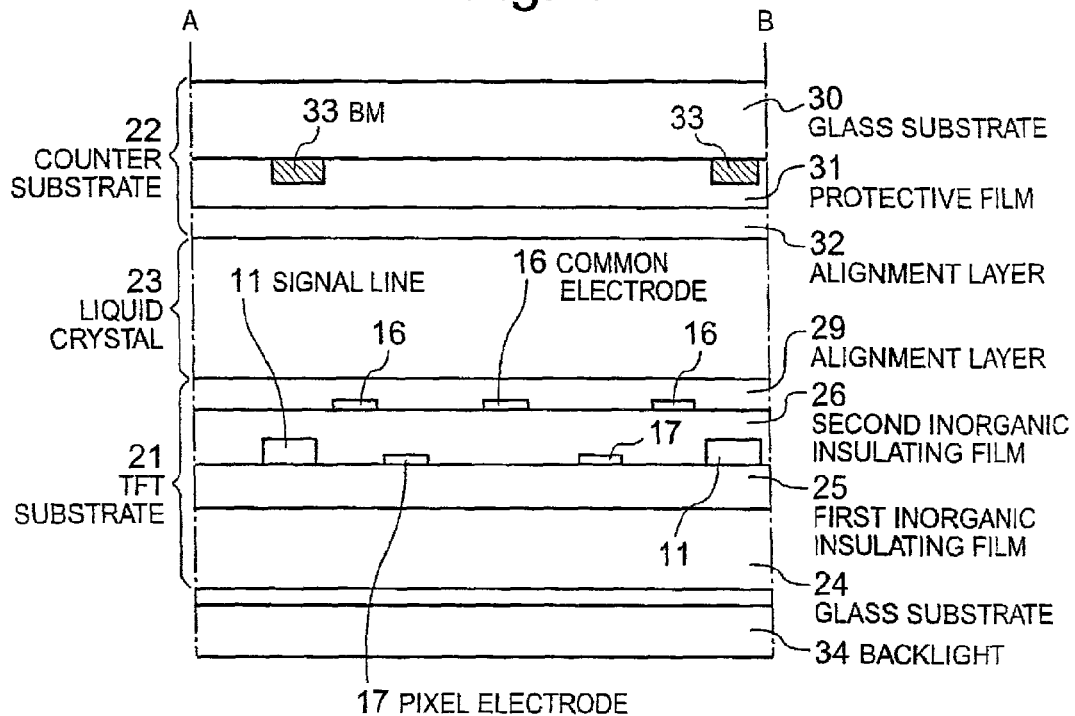
FIG. 2 is a sectional view showing the liquid crystal display of FIG. 1.

FIG. 1 is a schematic plan view on an enlarged scale of a one-pixel region of a liquid crystal display serving as a first embodiment of the present invention, and FIG. 2 shows a section taken along the line A-B of the liquid crystal display shown in FIG. 1. The components in FIGS. 1 and 2 are not drawn to scale, for ease of explanation.

As shown in FIG. 1, each of pixels of the liquid crystal display according to this embodiment is located in a region delimited by signal lines 11, and a scanning line 12 and common electrode line 13. The pixel comprises a drain electrode line 14, pixel electrode line 15, common electrode 16, pixel electrode 17, and TFT transistor 18. Each of the pixel electrode 17 and common electrode 16 forms a comb-shaped electrode structure and has repeating structures in the horizontal direction of the sheet surface shown in FIG. 1.

As for the TFT transistor 18 of each pixel, the source is connected to the corresponding pixel electrode 17 through the corresponding pixel electrode line 15 while the drain is connected to the corresponding signal line 11 through the corresponding drain electrode line 14. The TFT transistor 18 controls the signal input from the signal line 11 to the pixel electrode line 15 on the basis of the presence/absence of a voltage applied to the scanning line 12. Although no storage capacitor is shown for the sake of clarity, in practice a storage capacity is formed at a predetermined position in accordance with the layout of the liquid crystal display.

In this embodiment, each of the common electrodes 16 and pixel electrodes 17 is formed of a metal film. Each common electrode 16 is connected to the corresponding common electrode line 13 of an underlying layer through a first contact hole 19. Each pixel electrode 17 is connected to the corresponding pixel electrode line 15 of an underlying layer through a second contact hole 20.

As shown in FIG. 2, the liquid crystal display according to this embodiment has a structure in which a backlight 34, TFT substrate 21, liquid crystal 23, and counter substrate 22 are stacked in order from the bottom layer. In the liquid crystal display, a portion formed by stacking the TFT substrate 21, liquid crystal 23, and counter substrate 22 in this order constitutes a liquid crystal panel portion. A cold-cathode tube is used as the backlight 34.

The counter substrate 22 comprises a glass substrate 30, black matrix (BM) 33, protective film 31, and alignment layer 32. FIG. 2 envisions a monochrome liquid crystal panel to simplify the explanation of the present invention. The liquid crystal panel may instead be a color liquid crystal panel in which an RGB color filter layer is formed on the glass substrate 30.

The TFT substrate 21 comprises at least a glass substrate 24, a first inorganic insulating film (gate insulating film) 25, the signal lines 11, the pixel electrodes 17, a second inorganic insulating film (protective film) 26, the common electrodes 16, and an alignment layer 29, from the side of the backlight 34. Depending on the design guidelines for the liquid crystal display, an organic insulating film may be added on the second inorganic insulating film 26.

The first inorganic insulating film 25 is used to insulate the scanning lines 12 and common electrode lines 13 shown in FIG. 1 from upper layers. The signal lines 11 and pixel electrodes 17 are formed on the first inorganic insulating film 25 and are insulated from upper layers by the second inorganic insulating film 26. The wiring width and thickness and the wiring material are selected for each of the signal lines 11, scanning lines 12, and common electrode lines 13 such that the lines serve as desired wiring resistors. Each TFT transistor 18 is formed at a predetermined position of the upper portion of the corresponding scanning line 12 using the first inorganic insulating film 25 as a gate insulating film. The common electrodes 16 are arranged on the second inorganic insulating film 26. The liquid crystal 23 sandwiched between the TFT substrate 21 and the counter substrate 22 is driven by a lateral electric field (the horizontal direction of the sheet surface shown in FIG. 2) formed between the common electrodes 16 and the pixel electrodes 17.

The backlight 34 is arranged behind the TFT substrate 21. A surface of the glass substrate 24 which comes in contact with the backlight 34 has a polarizer (not shown) to limit polarization of the backlight 34.

A polarizer (not shown) is positioned on the outer surface of the glass substrate 30. The polarization direction of the polarizer is orthogonal to that of the polarizer behind the glass substrate 24. For this reason, when no electric field is applied to the liquid crystal 23, light from the backlight 34 that has passed through the glass substrate 24 cannot pass through the glass substrate 30, and the liquid crystal display shows black. The black mask (BM) 33, which blocks light, is disposed on the inner surface of the glass substrate. The BM 33 shields the signal lines 11, scanning lines 12, and common electrode lines 13 and virtually delimits the pixels.

Figure 3:
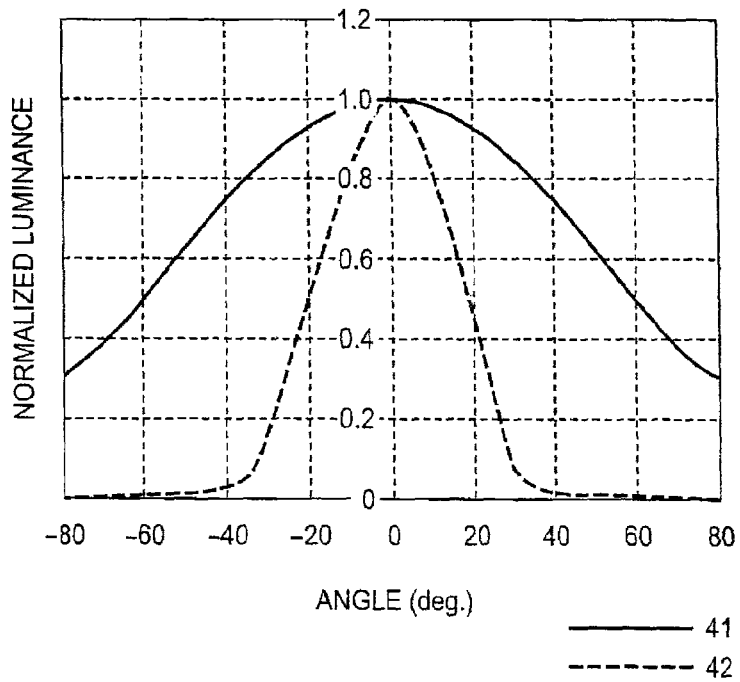
FIG. 3 is a graph showing the light distribution characteristics in the vertical and horizontal directions of a backlight used in the first embodiment.

FIG. 3 shows the light distribution characteristics in the vertical and horizontal directions of the backlight 34 used in this embodiment. In FIG. 3, a solid line denoted by reference numeral 41 represents the luminance distribution in the vertical direction of the sheet surface of FIG. 1 of the backlight used in this embodiment while a dotted line denoted by reference numeral 42 represents the luminance distribution in the horizontal direction of the sheet surface of FIG. 1 of the backlight used in this embodiment. According to FIG. 3, an angle at which a luminance is reduced to half of the front luminance (to be referred to as a half-luminance angle hereinafter) is ±60° in the vertical direction of the sheet surface of FIG. 1 of the backlight and is ±20° in the horizontal direction of the sheet surface of FIG. 1 of the backlight. The ratio between the half-luminance angle in the vertical direction of the sheet surface of FIG. 1 of the backlight and that in the horizontal direction of the sheet surface of FIG. 1 of the backlight is thus 3:1.

As described above, in this embodiment, the backlight 34 is arranged on the back of the liquid crystal panel such that the direction of the repeating structures of the pixel electrode 17 and common electrode 16 within one pixel coincides with a direction in which the half-luminance angle of the backlight 34 is small. In other words, in the horizontal direction of the sheet surface of FIG. 1, the direction of the repeating structures of the electrodes 16 and coincides with a direction in which the incident angle range of light incident from the backlight 34 on the liquid crystal panel is narrow.

A direction in which the backlight 34 has a narrow or wide half-luminance angle has the same meaning as a direction in which the angular range of light incident from the backlight 34 on the liquid crystal panel is narrow or wide, respectively.

Figure 4:
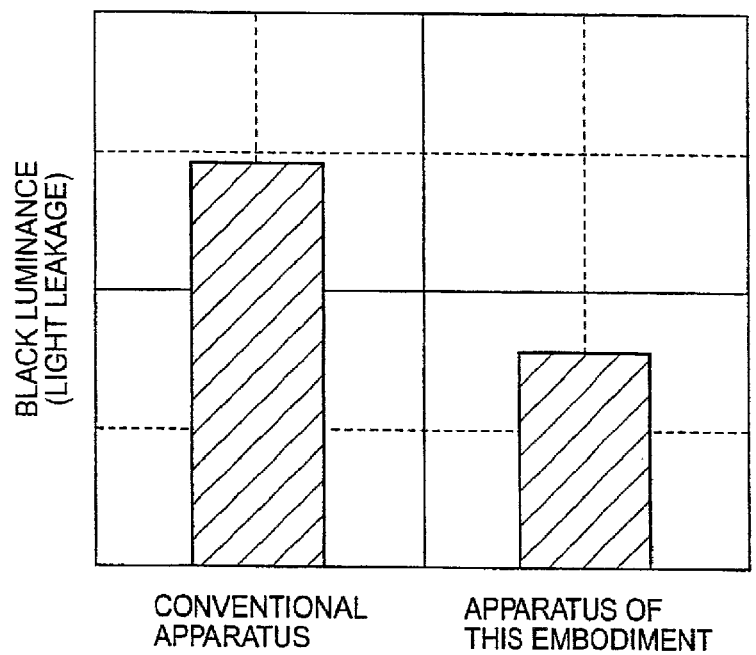
FIG. 4 is a chart showing a difference in black luminance between the liquid crystal display of the present invention and a conventional liquid crystal display.
Figure 5:
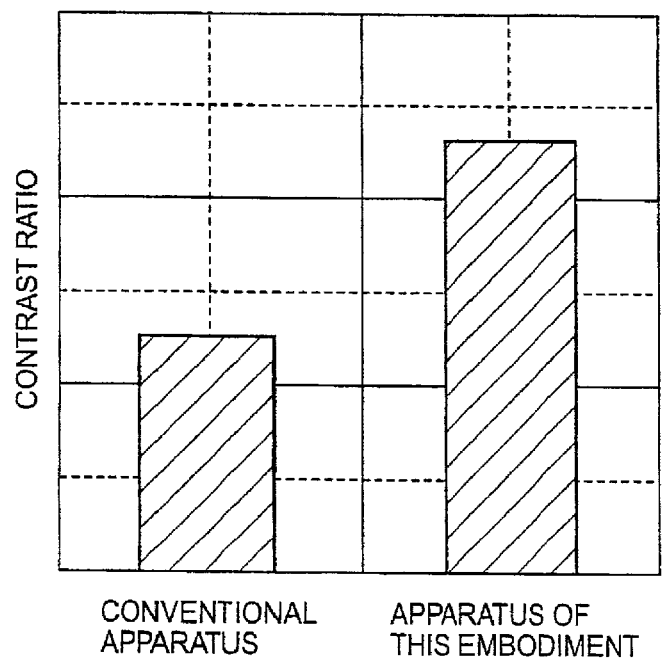
FIG. 5 is a chart showing a difference in contrast ratio between the liquid crystal display of the present invention and the conventional liquid crystal display.

FIGS. 4 and 5 show the black luminances and the contrast ratios, respectively, of the liquid crystal display of this embodiment and a conventional liquid crystal display. FIGS. 4 and 5 show that the black luminance of the liquid crystal display according to this embodiment is reduced to ⅔ or less than that of the conventional display, and the contrast ratio is increased by 1.7 times or more. Since the contrast ratio of a conventional in-plane switching mode liquid crystal display is approximately 600, the liquid crystal display of this embodiment can achieve a contrast ratio of 1,000 or more.

Since a direction in which the half-luminance angle of the backlight is ±20° is made to coincide with the direction of the repeating structures of the electrodes within one pixel, the viewing angle and the luminance in this direction is somewhat decreased. However, the half-luminance angle is equivalent to that of a conventional liquid crystal display in any other direction, and thus a wide viewing angle and high luminance can be maintained.

Figure 10:
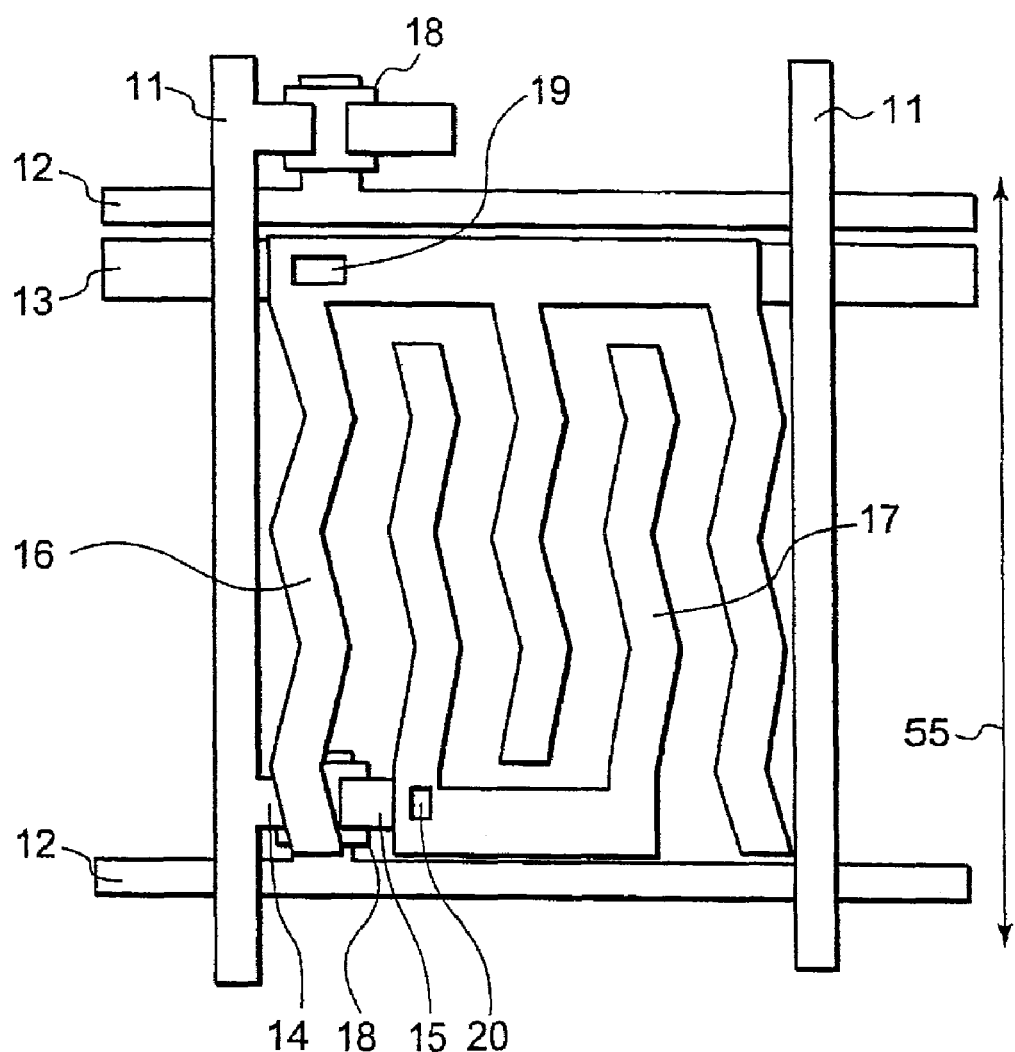
FIG. 10 is a view showing a modified electrode structure used in the liquid crystal display of the present invention.
Figure 11:
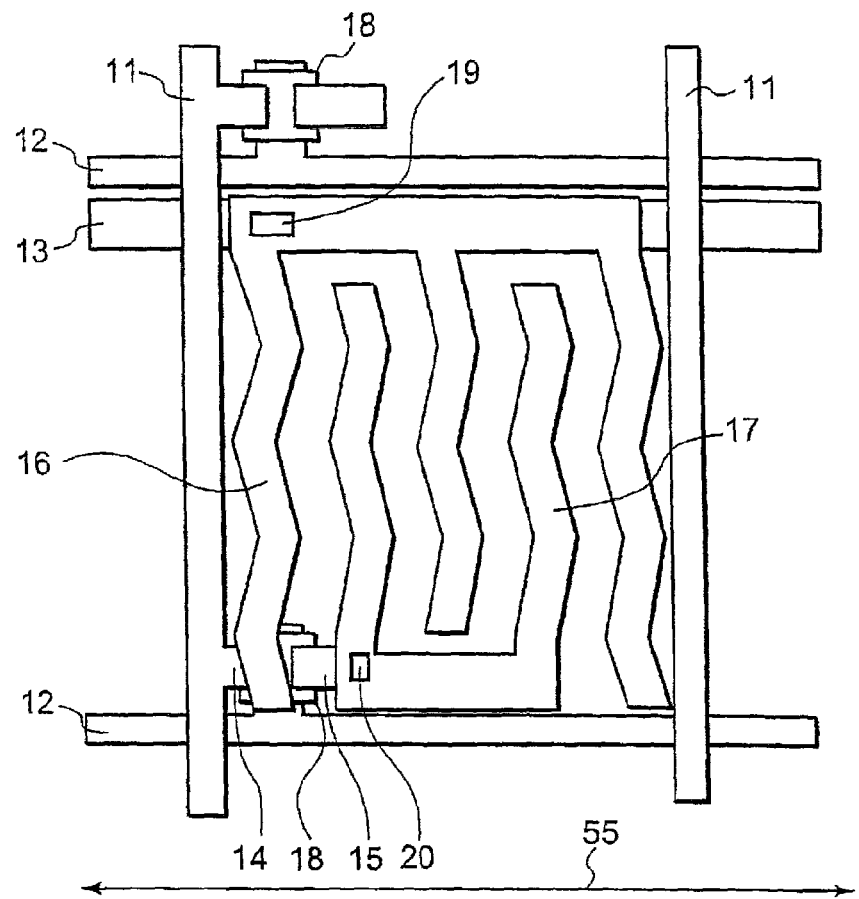
FIG. 11 is a view showing another modified electrode structure used in the liquid crystal display of the present invention.

In this embodiment, each of the pixel electrodes 17 and common electrodes 16 has a linear comb-shaped electrode structure. However, even if each comb tooth portion of the comb-shaped electrode structures is V-shaped (doglegshaped) or Z-shaped (zigzag-shaped), an increase in black luminance can be suppressed by limiting the incident light angle in a direction which coincides with the direction of repetitions of the comb tooth portions, such that the contrast ratio increases. For example, if each electrode structure is as shown in FIG. 10 or 11 in which Z-shaped comb teeth are formed repeatedly at regular intervals, the direction 55 in which the incident angle range of light incident on the liquid crystal panel of the backlight is narrow may be chosen as either the direction of an arrow shown in FIG. 10 or the direction of the arrow shown in FIG. 11.

In this embodiment, both the pixel electrodes and common electrodes are formed of a metal film. Even when they are formed of a transparent electrode such as an ITO (indium tin oxide) film, the same effects can be obtained.

(Second Embodiment)

Figure 6:
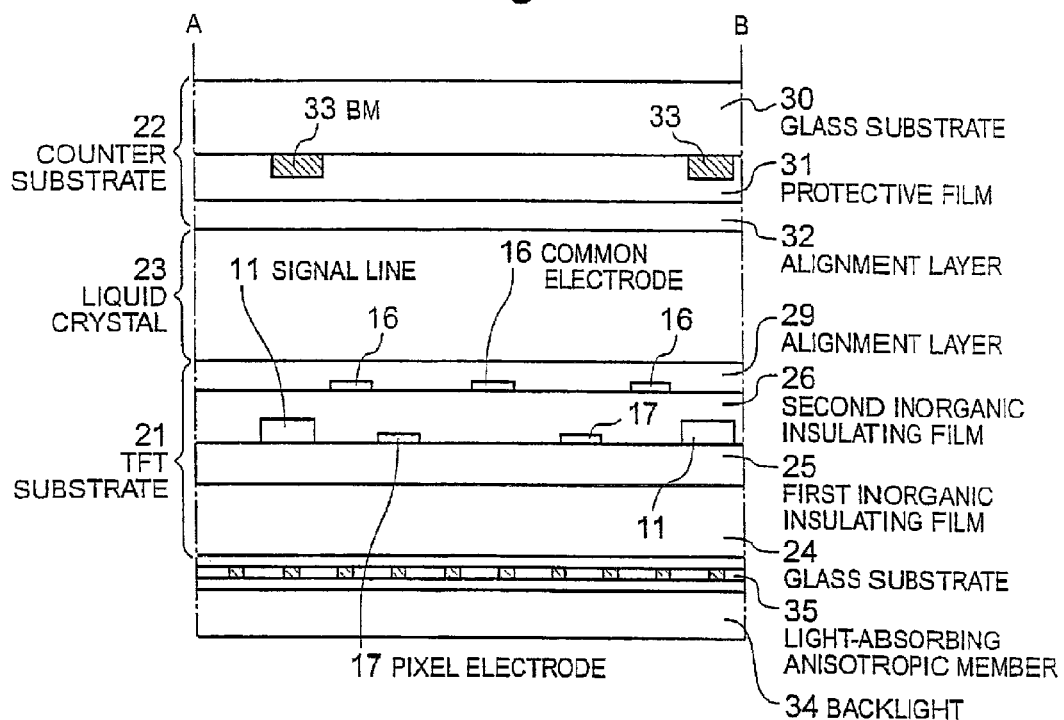
FIG. 6 is a sectional view showing a liquid crystal display according to a second embodiment of the present invention.

FIG. 6 shows a sectional view of a liquid crystal display according to a second embodiment of the present invention.

In this embodiment, as shown in FIG. 6, a light-absorbing anisotropic member 35 is arranged between a backlight 34 and a TFT substrate 21, and the direction of the repeating structures of electrodes within a pixel is made to coincide with the direction of the cycles of the repeating structures in the light-absorbing anisotropic member. Note that the same liquid crystal display as in the first embodiment is used.

Figure 7:
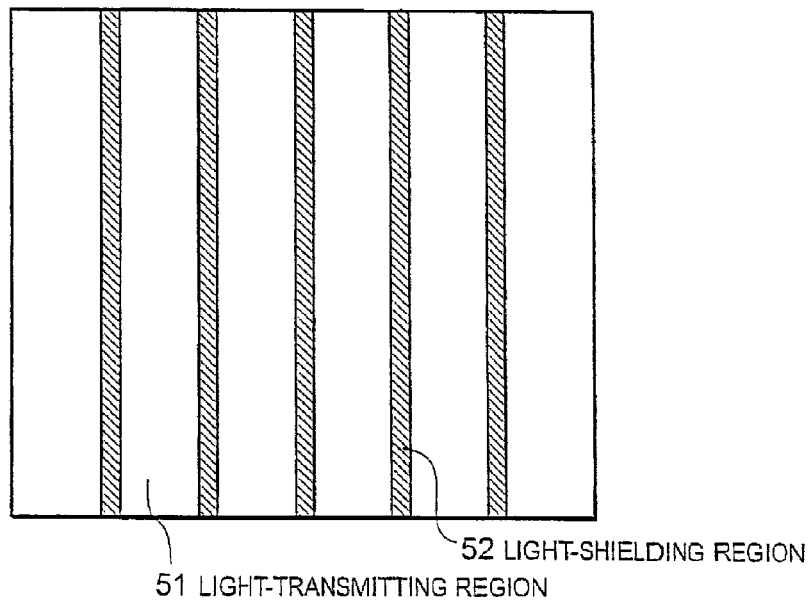
FIG. 7 is a plan view showing the structure of a light-absorbing anisotropic member used in a liquid crystal display of the present invention.

As shown in FIG. 7, the light-absorbing anisotropic member 35 has repeating structures of light-transmitting regions 51 and light-shielding regions 52 (in the horizontal direction on the sheet surface) and can limit the angle of incident light only in the direction of the repetitions. For example, Light Control Film (manufactured by Sumitomo 3M Limited) commercially available as a viewing angle control film can be used in this embodiment.

This embodiment increases the contrast ratio while maintaining a wide viewing angle and high luminance. Also, since the angle of light incident from the backlight is limited by the light-absorbing anisotropic member, a conventional backlight can be used without any modification.

Note that although this embodiment has explained in connection with a light-absorbing anisotropic member 35 whose light-transmitting regions and light-shielding regions have a lattice structure corresponding to the electrode structures within a pixel, the present invention is not limited to this. The photoanisotropic member may have any shape cooperating with the electrode structures. For example, if the comb tooth portions of a comb-shaped electrode structure are doglegshaped, a light-absorbing anisotropic member with doglegshaped light-shielding regions can be used.

(Third Embodiment)

Figure 8:
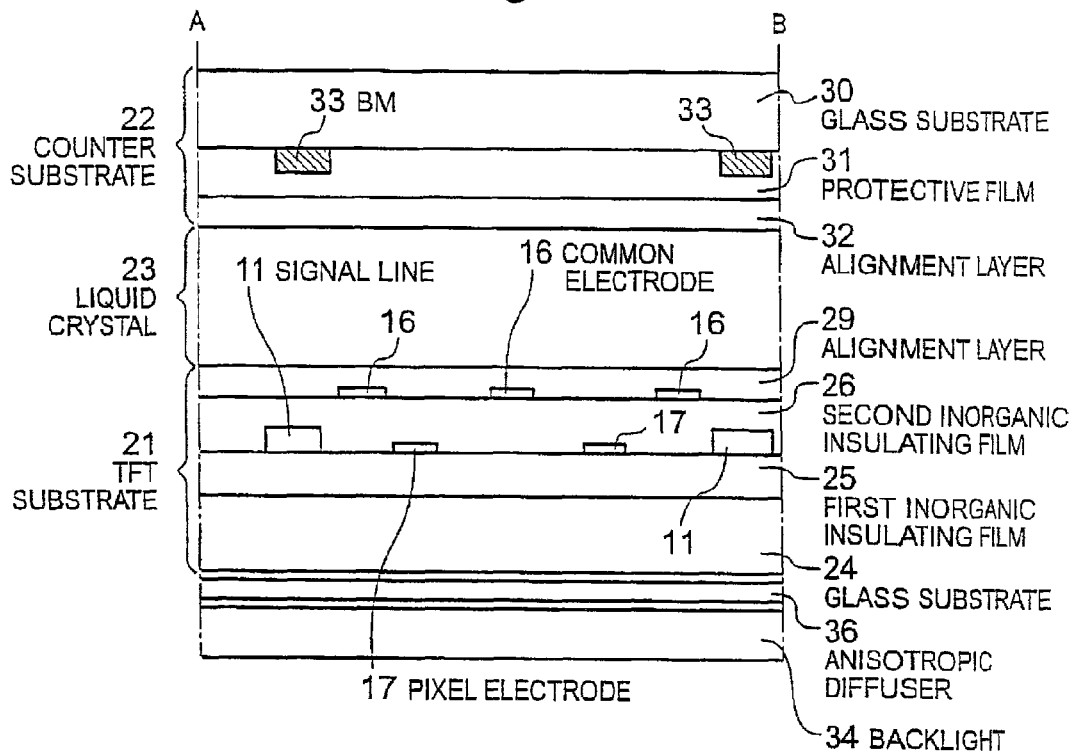
FIG. 8 is a sectional view showing a liquid crystal display according to a third embodiment of the present invention.

FIG. 8 shows a section of a liquid crystal display according to a third embodiment of the present invention.

The third embodiment is different from the second embodiment in that an anisotropic diffuser 36 is used instead of the light-absorbing anisotropic member, and a direction in which the diffusivity is small is made to coincide with the direction of the repeating structures of electrodes. This increases the contrast ratio while maintaining a wide viewing angle and a high luminance. Since the directivity of a backlight is shaped by the anisotropic diffuser, a conventional backlight can be used without any modification. A holographic diffuser can be used as a specific example of the anisotropic diffuser 36. A holographic diffuser is an aggregation of nonperiodic uneven patterns and can arbitrarily set the diffusion angle of light. Accordingly, the holographic diffuser can control the orthogonal diffusing power in accordance with the diffusion angle of a currently used backlight.

(Fourth Embodiment)

Figure 9:
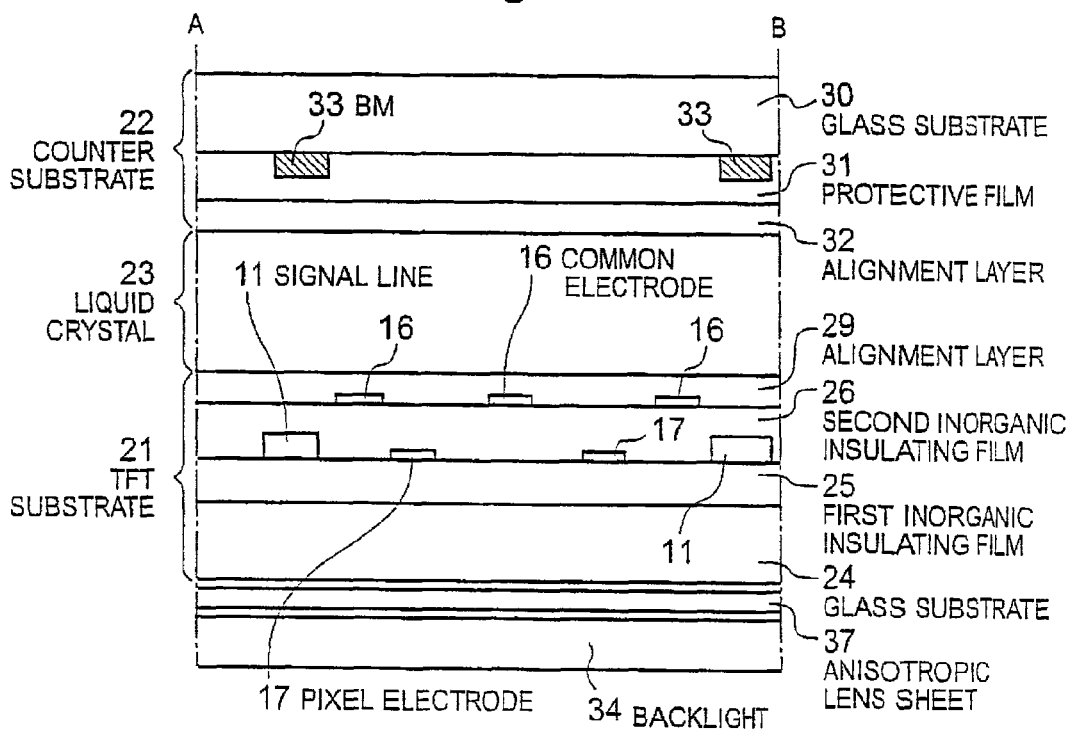
FIG. 9 is a sectional view showing a liquid crystal display according to a fourth embodiment of the present invention.

FIG. 9 is a sectional view showing a liquid crystal display according to a fourth embodiment of the present invention.

This embodiment is characterized in that an anisotropic lens sheet is arranged between a backlight and a liquid crystal panel, and the direction of the repeating structures of electrodes is made to substantially coincide with a direction in which the angular range of light incident on the liquid crystal panel is narrow.

More specifically, a prism sheet in which prisms are arranged in an array or a lenticular lens in which planoconvex cylindrical lenses are arranged in an array can be used. The incident angles from such prisms or plano-convex cylindrical lenses on a liquid crystal panel are different in respective directions orthogonal to the liquid crystal panel. The arrangement of a prism sheet or a lenticular lens in the same manner as in this embodiment permits a conventional backlight to be used without any modification, similarly to the second embodiment and third embodiment.

As for the arrangement of the anisotropic lens sheet on the backlight, the incidence angles from the prisms (or cylindrical lenses) on the liquid crystal panel need to be respectively different only in two directions orthogonal to each other and parallel to the liquid crystal panel, regardless of whether the prisms (or lenses) are arranged such that their prism planes (or lens planes) face the liquid crystal panel side or backlight side.

Although this embodiment has been explained using a lattice-shaped anisotropic lens so as to fit the repeating structures of linear electrodes, the present invention is not limited to this. The anisotropic lens sheet may have any shape as far as it cooperates with the electrode structures. For example, if the comb tooth portions of a comb-shaped electrode structure are dogleg-shaped, an anisotropic lens with a dogleg shape can be used.

(Fifth Embodiment)

Figure 13:
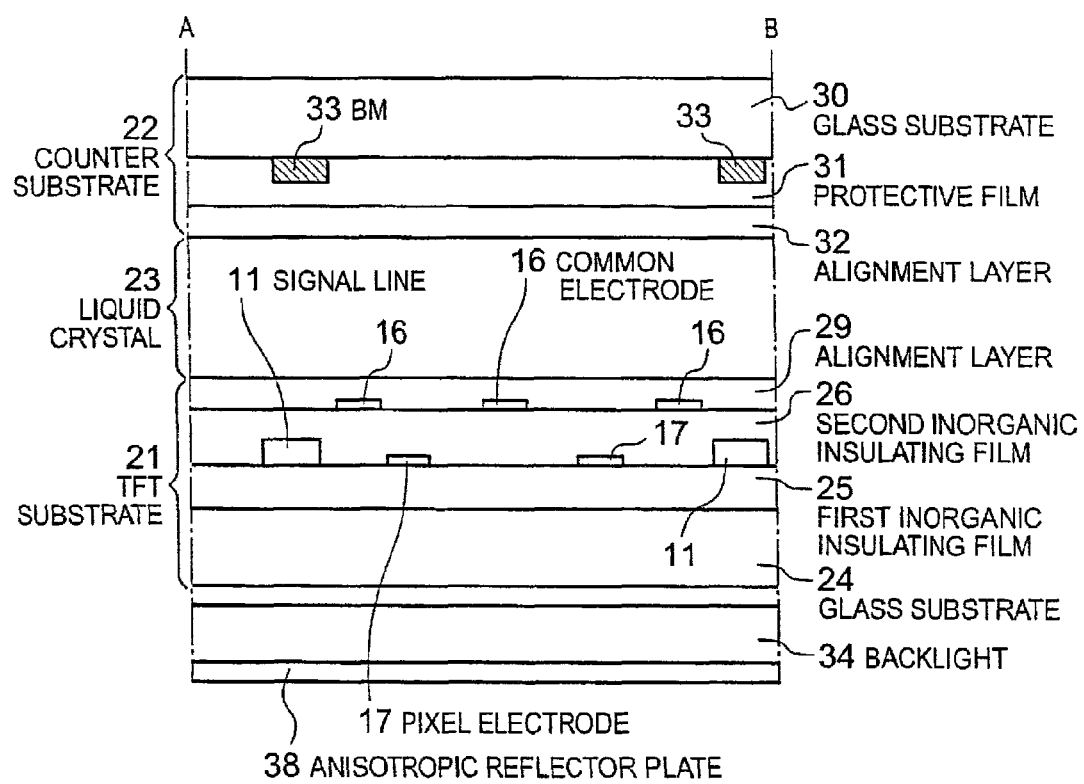
FIG. 13 is a sectional view showing the liquid crystal display according to a fifth embodiment of the present invention.

FIG. 13 is a sectional view showing a liquid crystal display according to a fifth embodiment of the present invention.

This embodiment is characterized in that an anisotropic reflector plate 38 is arranged on a back of the backlight, and the direction of the repeating structures of electrodes is made to substantially coincide with a direction in which the reflection angle range is narrow.

More specifically, a metal coating prism sheet in which prisms are arranged in an array can be used. The reflecting angles from such prisms are different in respective orthogonal directions. Light radiating from the backlight is reflected by the anisotropic reflector plate and passes through the backlight to the liquid crystal panel. Thus, the arrangement of a metal coating prism sheet in this embodiment permits a conventional backlight to be used without any modification, similarly to the second embodiment and third embodiment.

Preferably, in the various forms of liquid crystal displays described above, the vertical direction of display is a direction in which the incident" angle range of light incident on a liquid crystal panel is narrow. With this arrangement, even when the viewing angle in the vertical direction of display is limited, the viewing angle in the horizontal direction of display exhibits its characteristics as usual, thus allowing the display to be viewed with less discomfort than for a conventional liquid crystal module. In addition, since the direction of the repeating structures of electrodes within a pixel coincides with a direction in which the incident angle range of light incident on the liquid crystal panel is narrow, there can be provided a liquid crystal module with a wide viewing angle whose contrast ratio has been increased as compared to a conventional liquid crystal module.

On the other hand, if it is desired to limit the viewing angle in the horizontal direction, as might be desired for example in an automated teller machine or a cell-phone, the horizontal direction may be chosen as the direction in which the angular range of light incident on the liquid crystal panel is narrow.

The present invention has been explained with reference to a number of preferred embodiments. However, liquid crystal displays according to the present invention are not limited to the various forms described above. A liquid crystal display obtained by changing or combining, as appropriate, the above-described various forms falls within the scope of the present invention.

For example, a light source may be a front light instead of a back light.

Figure 12:
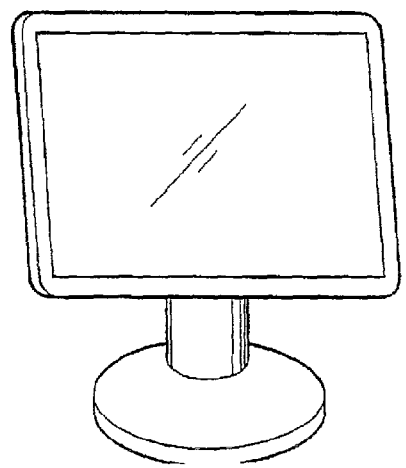
FIG. 12 is a perspective view showing terminal equipment to which the present invention is applied.

Applications of the present invention include a liquid crystal display used in terminal equipment (FIG. 12) such as a television, a monitor of a personal computer, a medical monitor, a car navigation system, a pachinko monitor or the like.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

The invention claimed is:

1. A liquid crystal display comprising:
a liquid crystal panel in which at least one of a pixel electrode and a common electrode formed within a pixel comprises repeating structures;
a light source illuminating said liquid crystal panel; and
an anisotropic diffuser arranged between said liquid crystal panel and said light source;
wherein an angular range of light incident from said light source on said liquid crystal panel is narrower along a direction of said repeating structures of said electrode than along an orthogonal direction; and
wherein a direction of repeating structures of the electrode coincides with a direction in which diffusivity of the anisotropic diffuser is small.

* * * * *